(12) United States Patent
Paloheimo et al.

(10) Patent No.: US 7,936,678 B2
(45) Date of Patent: May 3, 2011

(54) ENERGY AWARE EARLY DETECTION

(75) Inventors: Harri Paloheimo, Espoo (FI); Johanna Nieminen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/310,310

(22) PCT Filed: Jul. 13, 2007

(86) PCT No.: PCT/IB2007/001991
§ 371 (c)(1), (2), (4) Date: Feb. 19, 2009

(87) PCT Pub. No.: WO2008/032146
PCT Pub. Date: Mar. 20, 2008

(65) Prior Publication Data
US 2009/0196194 A1    Aug. 6, 2009

(51) Int. Cl.
*G01R 31/08* (2006.01)
(52) U.S. Cl. ....................................................... 370/235
(58) Field of Classification Search .................... None
See application file for complete search history.

(56) References Cited

U.S. PATENT DOCUMENTS

| | | | | |
|---|---|---|---|---|
| 5,525,890 A * | 6/1996 | Iwatsu et al. | | 320/106 |
| 5,631,532 A * | 5/1997 | Azuma et al. | | 320/102 |
| 6,675,220 B1 * | 1/2004 | Bergamasco et al. | | 709/232 |
| 7,477,601 B1 * | 1/2009 | Waclawsky et al. | | 370/232 |
| 7,590,064 B1 * | 9/2009 | Zhang et al. | | 370/235 |
| 2003/0018774 A1 * | 1/2003 | Flinck et al. | | 709/223 |
| 2003/0040316 A1 | 2/2003 | Stanforth et al. | | |
| 2004/0090917 A1 * | 5/2004 | Ruutu et al. | | 370/235 |

FOREIGN PATENT DOCUMENTS
WO  WO 03/015452 A2  2/2003
WO  WO 2005/025147 A1  3/2005

OTHER PUBLICATIONS

Jin, Xinyu, et al., "A RED Based Minimum Energy Routing Algorithm for Wireless Ad-Hoc Networks", © 2005, IEEE, pp. 757-761.
Van, Tien Pham, "Efficient Relaying of Video Packets over Wireless Ad hoc Devices", © 2006, WAMICON, 5 pgs.
Fallahi, Afshin, et al., "QoS and Energy Trade Off in Distributed Energy-Limited Mesh/Relay Networks: A Queuing Analysis", © 2006, IEEE, pp. 576-592.

* cited by examiner

*Primary Examiner* — Robert W Wilson
(74) *Attorney, Agent, or Firm* — Harrington & Smith (57) ABSTRACT

An incoming data packet is received, and a rate of change of residual capacity of a portable power supply is determined. From the determined rate of change it is decided to enqueue or drop the incoming data packet. If the decision is to enqueue, the packet is transmitted. If the decision is drop, the packet is deleted without transmitting. Additional factors may be considered in the decision, such as total energy capacity, residual energy capacity, and first and second derivatives of the residual energy capacity. Real time traffic may be treated differently than non real time traffic, and video enhancement layer packets can be weighted to drop more frequently than video base layer packets for the same flow. If used in the network, congestion probe packets are dropped at a rate matched to the rate at which data packets are dropped to give other nodes an accurate view of link quality.

18 Claims, 9 Drawing Sheets

| ITEM | RED | WRED | EAED |
|---|---|---|---|
| RSVP | NO | YES | NOT USED |
| IP PACKET PRIORITIZATION | NO | YES | NOT USED |
| TRANSPORT PACKET CLASSIFICATION TO NRT/RT | NO | QoS SOLUTION DEPENDENT | YES |
| RT PACKET TYPE CLASSIFICATION | NO | QoS SOLUTION DEPENDENT | OPTIONAL EXTENSION |
| AVERAGE QUEUE LENGTH METRIC | YES | YES | YES |
| ENERGY ASSESSMENT | NO | NO | YES |

AR – ACCESS ROUTER
AP – ACCSESS POINT
RN – RELAY NODE
MGW – MOBILE GATEWAY (COULD BE STATIC)
MR – MOBILE ROUTER (COULD BE STATIC)

☒ – DROPPED PACKET

WRED may also be configured to ignore IP precedence when making drop decisions so that non-weighted RED behavior is achieved. WRED is useful on any output interface where congestion might be expected, but WRED is typically used in the core routers of a network rather than at the edge where the IP network interfaces with another network operating with different protocol (e.g., wireless cellular, WLAN, etc.). Edge routers assign IP precedence to packets as they enter the IP network. WRED uses these precedences to determine how it treats different types of traffic, but WRED is seen as overly complex, especially for networks such as ad hoc that do not use a predefined infrastructure.

IP Explicit Congestion Notification (ECN) is only used when the two hosts signal that they want to use it. With this method, an ECN bit is used to signal that there is explicit congestion. This is better in some instances than the indirect packet delete congestion notification performed by the RED/WRED algorithms, but it requires explicit support by both hosts to be effective. Some outdated or buggy network equipment that does not support ECN have been known to drop packets that have the ECN bit set, rather than ignoring the bit. When a router receives a packet marked as ECN capable and anticipates congestion (e.g., using RED), it will set a flag notifying the sender to decrease its window size (sending rate). The intent is to avoid that sender resending packets that would add further congestion.

What is needed in the art is a more elegant method and apparatus for packet scheduling that is designed to meet the needs of wireless mesh networks. The solution described herein has broad applications for any such mesh network, but are particularly advantageous to address specific limitations inherent in wireless networks.

SUMMARY

In accordance with one embodiment is provided a method that includes receiving an incoming data packet, determining a rate of change of residual capacity of a portable power supply, deciding to queue for transmission or to drop the incoming data packet based on the determined rate of change, and transmitting or dropping the incoming data packet according to the decision.

In accordance with another embodiment is provided a program of machine-readable instructions, tangibly embodied on a memory and executable by a digital data processor, to perform actions directed toward gracefully degrading packet relay. The actions include receiving an incoming data packet, determining a rate of change of residual capacity of a portable power supply, deciding to queue for transmission or to drop the incoming data packet based on the determined rate of change; and transmitting the incoming data packet or dropping the incoming data packet according to the decision.

In accordance with yet another embodiment of the invention is provided a device that includes an antenna, a transceiver, a portable power supply and a processor. The antenna is coupled to the transceiver and is adapted to receive an incoming data packet over a first wireless link. The portable power supply is coupled to the transceiver. The processor is coupled to the portable power supply and is adapted 1) to determine a rate of change of residual capacity of the portable power supply, and 2) to decide to queue for transmission or to drop the incoming data packet based on the determined rate of change. For the case where the decision is to queue the incoming data packet for transmission, the transceiver is adapted to send the data packet over a second wireless link. For the case where the decision is to drop the data packet, the data packet is deleted without being sent.

In accordance with another embodiment of the invention is provided a device that includes means for determining a rate of change of residual capacity of a portable power supply, means for deciding to queue an incoming data packet for transmission or to drop the incoming data packet based on the determined rate of change, means for transmitting the incoming data packet for the case where the decision is to queue the incoming data packet, and means for deleting the incoming data packet without transmitting it for the case where the decision is to drop the incoming data packet. In one particular embodiment, the means for determining includes a voltmeter and a voltmeter rate detector coupled to a processor, the portable power supply includes a galvanic battery, the means for deciding includes the processor, the means for transmitting includes a transceiver coupled to a queue in a local memory, and the means for deleting includes a computer instruction stored in the local memory and executable by the processor and coupled to the queue.

These and other embodiments are detailed below with more particularity.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

Following are some acronyms used in the description below:
AP access point
AR access router
CR cognitive radio
DYMO dynamic Manet on-demand
EAED energy aware early detection IETF internet engineering task force
MANET IETF mobile ad hoc networks (working group)
MGW mobile gateway (could be static)
MR mobile router (could be static)
NRT non-real-time
OLSRv2 optimized link state routing
QoS quality of service
RED random early detection
RN relay node
RT real-time Embodiments of the invention use an early detection principle, but unlike RED which uses mere randomness and queue length, embodiments of this invention use more advanced metrics to enable energy conservation through active queue management, which is termed herein as Energy Aware Early Detection (EAED). These metrics for packet discard criteria may be one or more of the following:

Energy assessment
Queue length
Packet type (real-time or non-real-time packet)
Avoiding consecutive drops for the same RT flow (improve audio/video quality)

Most advantageously RT but also useful for NRT packets are dropped based on an energy assessment performed by the wireless relay node in the network. This energy assessment distinguishes over the art cited above as it uses in some embodiments $1^{St}$ and $2^{nd}$ order derivatives of residual battery energy capacity information in addition to transient status information. This allows more precise assessment, more appropriate forward/discard decisions, and improved network throughput, to name a few benefits.

In embodiments of the invention, certain packets are dropped with a rate proportional to the battery state of the node determining whether to queue or drop the packet. The results are seen as optimal with real-time traffic flows, such as voice or video, that are not affected by a few dropped packets or missing frames. The gradient of quality degradation in this case would be continuous up to a point where another path in the network would be chosen to satisfy any QoS requirements for the flow.

In particular, the invention enables in certain embodiments conservation of energy by allowing graceful degradation of traffic (most advantageously, RT traffic) by energy aware active queue management. Packets are dropped from the input queue buffer based on an assessment of current battery status, predicted future battery status, queue length, and packet type. Not all embodiments need use all of these factors, and different embodiments may weight the different factors differently. Embodiments of this invention are applicable to wireless mesh networks with relay nodes, ad hoc networks, hybrid networks (e.g., 4G radio access networks which have a predefined infrastructure complemented with ad hoc networks with no predefined infrastructure), sensor networks, and networking solutions applying cognitive radios.

Application of EAED in Sensor and Cognitive Radio networks differs from use cases typical to communication oriented networking solutions. Even Sensor and CR networks can be used in communication applications, they mostly concentrate in delay tolerant, connectionless; and even device-to-device type of information gathering and transferring operations over wireless connections. These types of information sources include, for example, a mobile device aware of its surroundings or a dedicated sensor device. This kind of traffic is by default classified as non-communication and usually non-real time traffic by nature. The inherent problem in these Sensor and CR specific use cases is that the more detailed and the more accurate information is collected and transferred over wireless links and networks, the more radio frequency bandwidth, CPU, memory storage, and energy is consumed. As a partial solution, EAED can be applied to enable intelligent traffic aggregation and filtering mechanism. Regarding cognitive radios and sensor networks with various sensor or information sources and sinks as per node, redundancy of received telemetry or priority of collected information can be used as packet dropping criteria. This is analogous with communication oriented applications where redundancy of packets in RT video or audio flow is used as a criteria in forming a packet dropping decision.

Existing prior art solutions and most advantageous EAED use cases comprise of ISO OSI (International Standards Organization—Open Systems Initiative) transport and networking layer traffic shaping based on EAED principle. Transport layer operations cover TCP (transmission control protocol) and UDP (user datagram protocol) user plane traffic applications. MANET routing protocol probing operations are carried out on networking layer. However, EAED principle can be applied on any OSI/ISO layer in a device acting as an energy limited traffic forwarding, relaying or routing entity with wireless or wired connections. The optimal operation layer or layers are performance, use case, SW/HW (software/hardware) architecture and implementation dependent. Additionally, EAED principle can be applied to both user and/or control plane data traffic shaping.

Figure 1A:
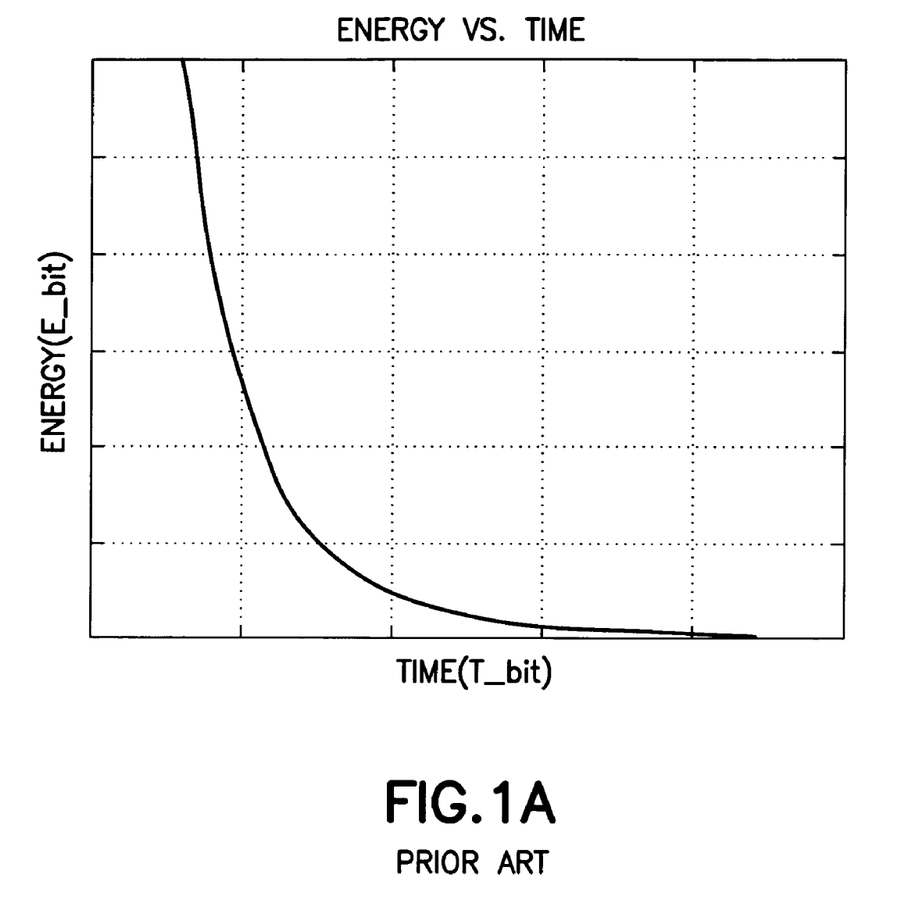
FIG. 1A is an energy versus time diagram for packet transport through a mesh or ad hoc network according to the prior art "lazy packet" scheduling regime.
Figure 1B:
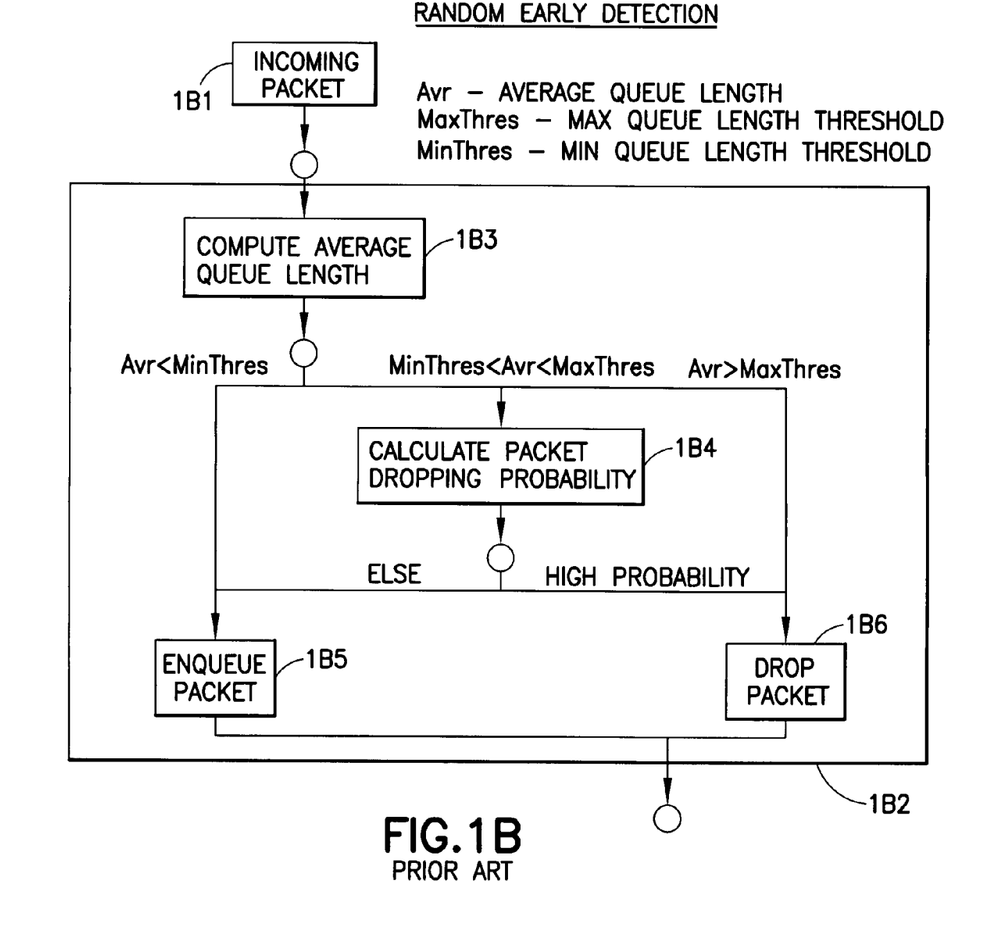
FIG. 1B is a diagram of the prior art random early detection approach to scheduling packets for relay.
Figure 2:
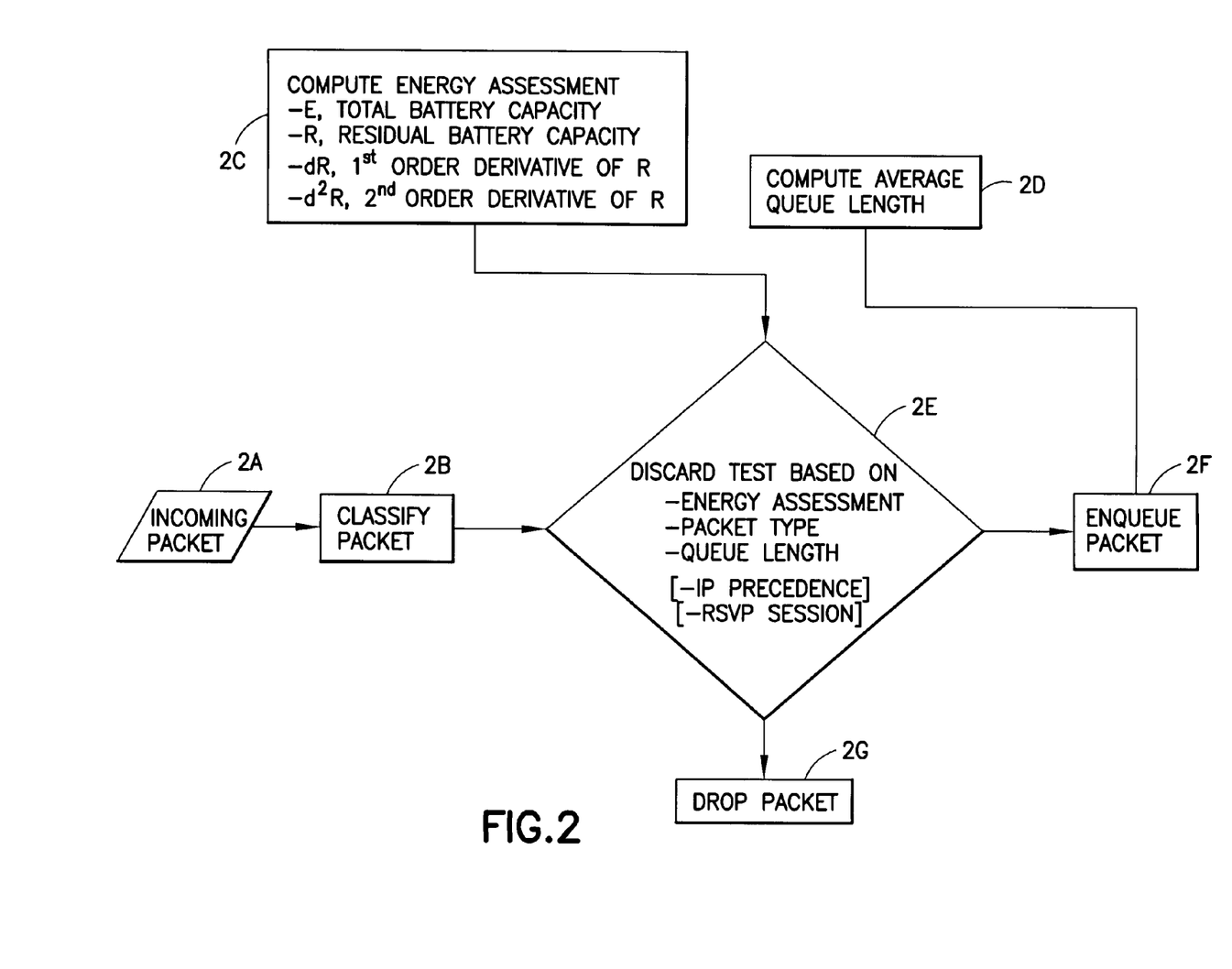
FIG. 2 is a process flow diagram detailing steps for determining whether to drop or queue a packet for relay according to an embodiment of the invention.

FIG. 2 is a process flow diagram detailing steps for determining whether to drop or queue a packet for relay according to an embodiment of the invention. At step 2A, an incoming packet is detected at a relay node of a network. Typically, the incoming packet would be entered into the node's buffer at this point. At step 2B, the packet is classified. A simple and energy efficient implementation is to determine packet type (e.g., VoIP, other audio or video) and classify the packet as RT or NRT. More intricate techniques may alternatively be used, such as opening and reading a packet header for bits indicative of a classification. The latter is seen as more energy intensive, and slows packet transport somewhat. Regardless of how packet classification is determined, the classification is generically referred to as packet type.

At step 2C, an energy assessment is made by the network node into which the packet is incoming. This assessment may be done for each incoming packet, or periodically with the results applied to all incoming packets until the next time the periodical assessment is done. Note that in some embodiments, the time interval between consecutive energy assessments may be adaptable based on traffic volume; shorter intervals for large traffic volume (e.g., over a threshold), longer intervals for lower traffic volume (below the same or a different threshold). In some embodiments, the energy assessment considers total battery capacity (E), residual battery capacity (R), rate of change of residual battery capacity (first order time derivative of R), and rate of acceleration of residual battery capacity (second time derivative of R). Other embodiments of EAED may use only some of those computation results, and others may use some or all of the above with additional parameters such as QoS parameters. In embodiments enabled for QoS, the same algorithm may be used to render a decision for packets not bearing a QoS parameter by adapting the algorithm to render a neutral QoS value for those packets. As above, any of these data points may be weighed differently in different embodiments. EAED may use multiple parallel packet queues with differing configuration of weights and drop criteria.

At step 2D, the average queue length is determined. As with the energy assessment, the average queue length need not be done for each incoming packet, but preferably is. There is no requirement that frequency of energy assessment match that of measuring average queue length; energy assessment may be periodical while determining average queue length may be done for each incoming packet.

Figure 3:
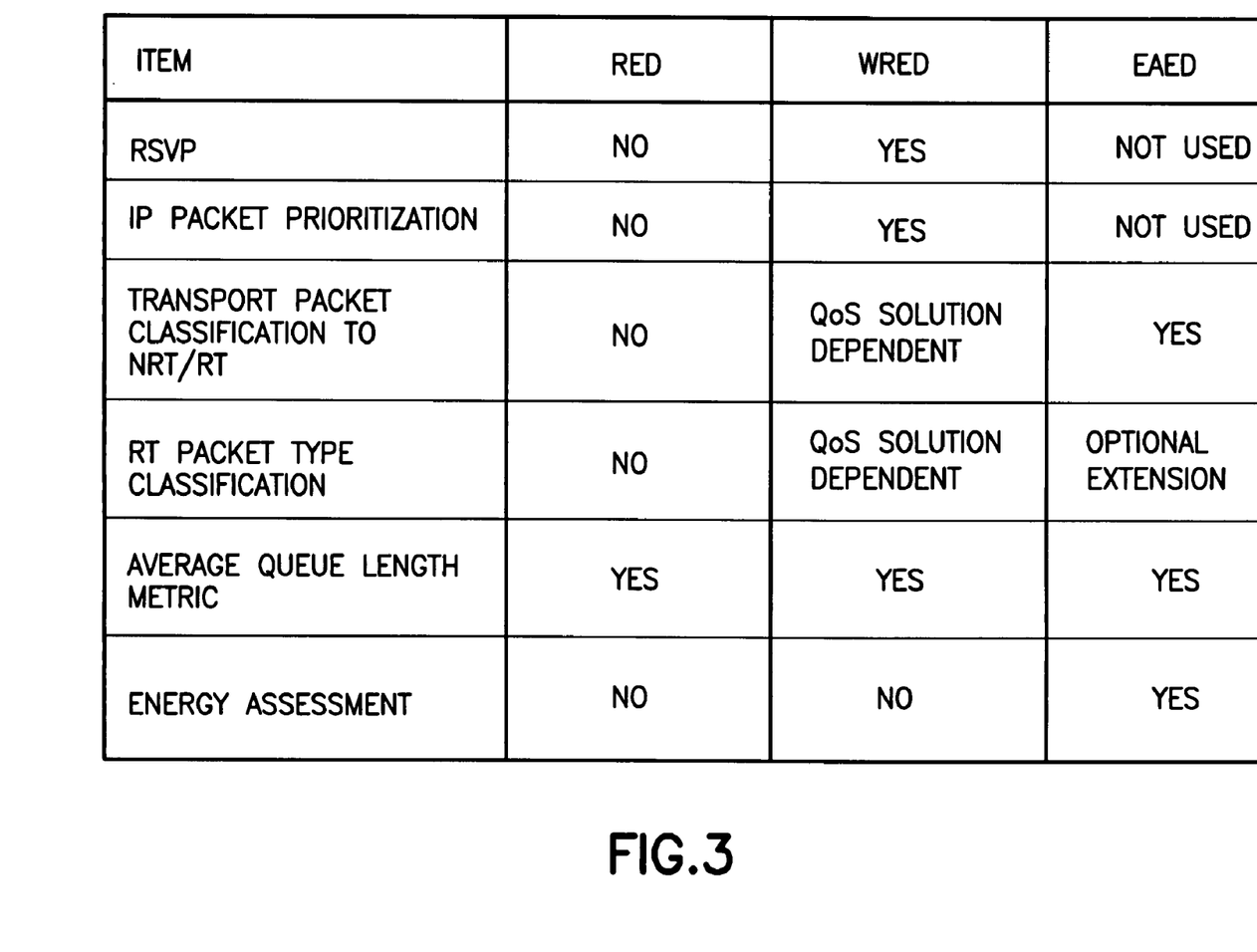
FIG. 3 is a table comparing various packet qualities and performance metrics of the embodiment of FIG. 2 against two prior art methods for packet relay.

Now at step 2E the data from steps 2B, 2C and 2E is compiled according to an algorithm to arrive at a discard/queue decision, of which specific examples are detailed below. If the decision given by the algorithm is to queue the packet, then at step 2F it is queued for relay to another network node or to the ultimate destination (e.g., a mobile terminal MT), depending upon the relative position in the network at which the subject network node executing the steps of FIG. 2 lies. After being queued, the packet is then forwarded as appropriate to the next node (network or end user). If instead the algorithm from step 2E yields a discard decision, then at step 2G the packet is discarded and not queued:

Before considering specific implementations of an EAED algorithm, consider the table of FIG. 3 which compares packet handling capabilities of RED, WRED, and EAED. The resource reservation protocol RSVP or IP packet prioritization is not used in EAED (though prioritization can be used in some embodiments as noted above for packet classification). In the most energy efficient embodiment, only RT/NRT classification is used in EAED, whereas such classification is not used in RED and depends upon whether full Diffserv QoS is sued in WRED. RT packets may be classified with more particularity in some embodiments of EAED (e.g., audio or video). Whereas each of RED, WRED and EAED use some average queue length measure, of the three only EAED uses an energy assessment in determining queue/drop for a particular packet.

Now are detailed some exemplary and non-limiting algorithms for the decision noted for step 2E of FIG. 2. Using the conventions noted above for E and R, one prior art implementation that considers energy in the drop/queue decision uses a function of (E−R)/R. This leads to less than optimal decisions in certain instances as the battery depletion rate is not a factor in the analysis. Consider FIG. 4 which charts this prior art approach, where the energy is depleting along the curved line (not recognized in the prior art). In the illustrated example of FIG. 4, energy from the battery is depleting rapidly, so the decision to queue and forward the packet within the time $t_1$ at the point where the residual battery energy capacity is R further depletes the battery's energy E at a relatively high rate. Said another way, until $R_{min}$ is actually reached, there is no capability of this prior art approach to effectively manage energy because it does not recognize the rate of energy depletion.

Figure 4:
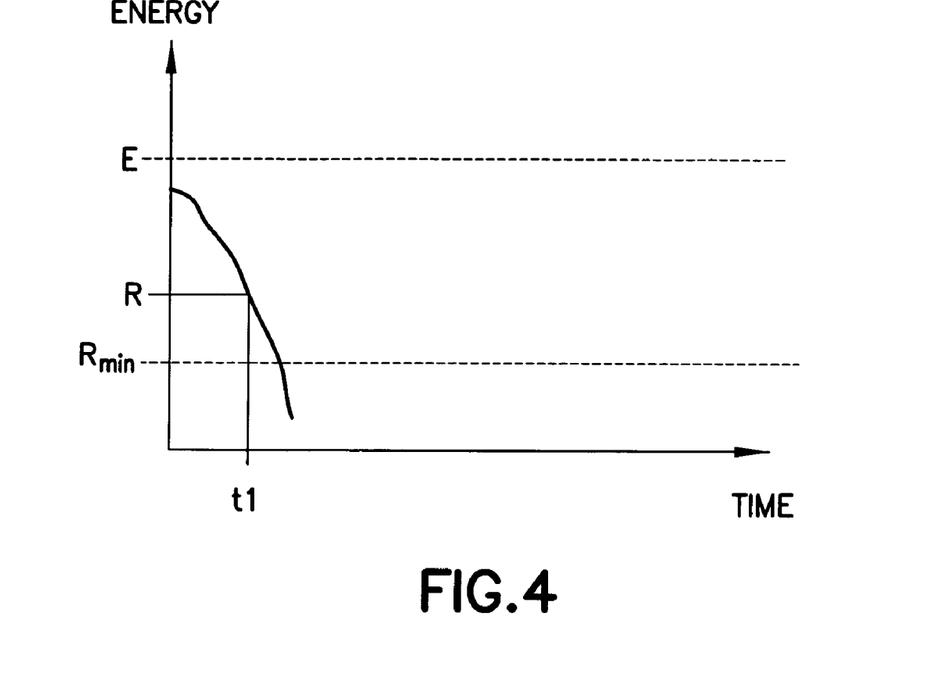
FIG. 4 is a graph of energy versus time for a prior art RED-based minimum energy routing algorithm.
Figure 5:
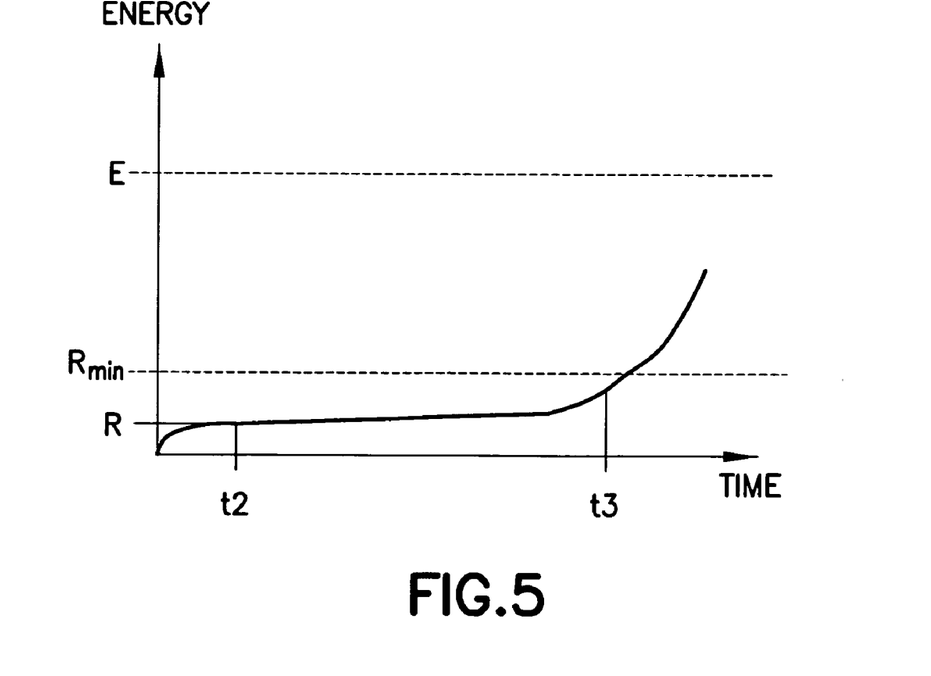
FIG. 5 is a graph of energy versus time for an embodiment of the invention that considers battery repletion rate.

The energy saving advantage of EAED may be seen in comparing the energy versus time diagrams of FIGS. 4 and 5, where FIG. 5 illustrates an algorithm according to EAED where rate of battery depletion is evaluated. Energy depletion of a battery is a net result of depletion and repletion. Deciding at time $t_2$ to forward the packet is energy neutral, because the depletion rate and repletion rate of the battery are equal. Forwarding does not adversely affect energy of the network node despite the residual energy capacity of the battery being below $R_{min}$ because of that net equilibrium, so forwarding is fully sustainable. Another scenario is shown at time $t_3$ where repletion rate exceeds depletion rate. As with time $t_2$, forwarding at the conditions of time $t_3$ are fully sustainable because at time $t_3$ the battery is repleting faster than it is depleting, despite being still below the prior art's forwarding decision threshold of $R_{min}$.

An exemplary EAED algorithm uses at least one of the following metrics in its queue/drop decision for a packet:

$$f_2 = \frac{dR}{dt} \text{ and/or } f_3 = \frac{d^2R}{d^2t};$$

where d indicates first derivative, $d^2$ indicates second derivative, and t indicates time.

Consider $f_2$ above, the first derivative of residual energy with respect to time. This tells the gradient of residual battery energy capacity status (the slope of the energy versus time curve), and is a cumulative result of depletion and repletion of the battery. Forwarding using this metric, rate of depletion/repletion, is based on an intelligent prediction of dR/dt and preceding pattern history of battery discharge/recharge in the device/network node. The $f_3$ formulation above, the second derivative with respect to time, informs of the intensity of that gradient change of residual battery energy capacity (the curvature of the energy versus time curve). This tells how fast the battery is being depleted/repleted, and so enables the drop/queue decision to be an intelligent prediction of $d^2R/d^2t$ and preceding pattern history of battery discharge/recharge in the device/network node.

Note that the above assumes without explanation that a battery may be repleted while operating in a wireless network. This is because a wireless router battery may be recharged while operating. While this may be only a trickle charge in some instances, the net effect on packet forwarding decisions is not trivial, and to the inventors' knowledge is not considered in the prior art. For example, a wireless portable router may replete its battery charge by being connected to an AC wall socket (wherein it still operates on battery power and a transformer converts the AC input voltage to DC for battery repletion), or to a car battery (straight DC repletion). Other instances of repletion include electricity infrastructure independent energy sources and carriers such as solar, fuel cell, kinetic, organic or a temperature gradient to accumulate an electric charge for repletion.

As seen in a comparison of FIGS. 4 and 5, EAED enables greater precision than the nearest known prior art in packet forwarding decisions that are based (at least in part) on energy considerations. As is evident, the EAED approach also increases complexity, though the extent is seen to be a minimal additional energy drain.

Now consider an expansion/adaptation of the above basic EAED regimen in the context of layered video coding LVC. LVC is useful in coping with heterogeneity of user access rates, in network link capacities, and in link reliability. A layered coder encodes video into several layers. The base layer BL, which includes a crucial part of the video frames, guarantees a basic display quality. Each (correctly received) additional enhancement layer EL improves that basic video quality. Without the BL, video frames cannot be reconstructed sufficiently at the receiver. Typically, EL packets may be dropped at a congested node to protect the BL packets, and the BL packets are further typically protected by forward error correction FEC and/or automatic repeat request ARQ. Because both EL and BL packets are RT (video), simply classifying them as RT without further differentiation might result in dropping the more critical BL packets, or at least too many of the BL packets. In the classification step (2B of FIG. 2), embodiments of EAED can be made to differentiate between BL and EL packets and place a higher drop probability on the EL packets, which has the effect of avoiding dropping too many consecutive RT packets of the same flow.

As an example, the packet discard decision may be calculated using the following generic equation. Metrics are presented in their default order of relative importance. That is, in a default setting. However, the weights (A through G) that give the relative importance to the metrics are configurable. In the case of RT traffic, one would set B=0 and the relative importance of the remaining variables would be A>C>D>E>F>G. Weights C and D are detailed below. Note that for these weights, which relate to packet relative position in the queue PQ and packet age in the queue PAQ respectively, one must be zero and one must be non-zero. On the other hand in the case of NRT traffic, the metrics PQ, PAQ, PT and CDP are not relevant factors (e.g., the weights C,D,E,F,G=0). These objectives for different treatment of RT and NRT packets could be realized by having separate queues for RT and NRT with differing discard criteria and factor weights.

$$P_{discard} = A \times EA + B \times QL + C \times PQ + D \times PAQ + E \times PT + F \times CDP + G \times PAS);$$

where C+D=X
and C,D∈[0,X]

EF=energy factor deduced from energy assessment
PQ=metric deduced from relative packet position in a queue
QL=metric deduced from queue length
PAQ=metric deduced from packet age in the queue
PT=packet type (e.g., RT or NRT; varying RT packet types could have varying weights)
CDP=consecutive dropped packet
PAS=packet age from source (optional)

Example: With RT, the various weights are set based on the following principles. If the energy assessment result (EF) exceeds a certain adjustable threshold, packets are dropped. If a packet has become stale (PAQ or PAS) even though it is at the top of the queue to be transmitted, it is dropped. If packet is recent (PQ), but it is at the end of a long queue, it is dropped. If packet type (PT) is less critical, the packet is dropped. Also, a packet is dropped in proportion to the number of consecutive packets dropped in a same flow (CDP). The measured queue parameters are not statistical in nature but the metrics deduced from them can be. This is the case especially for PQ, QL and PAQ. This follows from the fact that the effect of a given measure to RT packet discard value is evaluated from its relation to queue behavior, which in turn depends indirectly from statistical variables. The statistical variables such as wireless channel. Properties or system resource allocation affect also queue behavior indirectly. As mentioned earlier, energy assessment may utilize derivatives of R in making statistical predictions or extrapolations based on historical data. From this is deduced the energy factor EF.

EXAMPLE

Discard Decision Algorithm for RT Traffic (Weight B=0)

1. Compute energy assessment EAS
2. if EAS is less than EAS_max; then set P_discard=0. EAED does not discard packets in this case.
3. else calculate the full discard value P_discard.
    a. Energy factor EF: Variable value is set inversely in proportion of the energy assessment. Low energy assessment value results in high discard value EF
    b. Packet age PAQ and/or PAS: Value is set in proportion of the packet age. Older RT packets are given a higher discard value PA.
    c. Packet position in queue PQ: value is set in proportion of its ordinal number from the beginning (transmission) of the queue. Packets further in the queue are given higher values.
    d. Packet type PT: Packets of less critical type, are given a higher discard value PT.
    e. Consecutive discarded packets: Packet discard value is set in proportion to the number of consecutively discarded packets in a same flow.
4. if the computed P_discard is greater than P_max threshold; then discard the packet
5. else enqueue packet In practical implementation, information from energy-adaptive scheduling block could be utilized in energy assessment. For example, adaptive modulation level required to maintain a required delay-bound in the scheduler could be filtered and this filtered value could be used as a metric to indicate increasing energy consumption and thus decreasing residual energy in the queue management block.

While the order of packets in the queue determines (in the prior art) the order of transmission, the metric PAQ can be used to preempt that order in that the PAQ metric can cause a packet to be dropped from the queue. In a simple case, one can predict a transmission time for queued packets based on an estimate of transmission delay for the queued packets.

Such a delay might be estimated as follows. If one assumes that transmission delay is constant for all packets in the queue (or can be averaged), then calculate the cumulative delay for transmitting packets in the queue (number_of_packets_in_the_queue×TX_delay) and set a hard limit for the ordinal number after which RT packets would be dropped. A number of bytes may also be used instead of the number of packets (since packets can be of variable length).

However, if one were to use lazy packet scheduling schemes, channel adaptation techniques, FEC (to increase redundancy in transmitted data), contention based channel access, system resource contention, etc., then the assumption does not hold; there are highly variable transmission delays. In that instance, we may then use a lower boundary or statistical evaluation of transmission delay. In the former case, it may be calculated how long it would take to transmit packets in the queue in the best case scenario. If this best case boundary value exceeds some predefined maximum limit (X ms) for packet RT life-time in the buffer, then discard arriving packets based in that evaluation. Combining the two would mean having a best case boundary and probability based on the ordinal number or amount of data.

The following considerations are relevant to determining the PQ (relative packet position) metric:

If separate queues are used for RT and NRT traffic, then the prediction of transmission delays becomes more accurate. The packets are dealt with in a similar way in transmission. They are on average similar length (generally RT packets are short and NRT packets are long).

Additionally, instead of an ordinal packet order, the algorithm might be adapted to evaluate the amount of data (payload) to be transmitted. As above, it would be difficult to accurately estimate how long it would take to transmit a certain amount of data if the distribution between RT and NRT data is not known.

For the PQ metric assessment, a hybrid of the options noted above would combine the best case boundary and the discard probability based on the ordinal number or the amount of data.

Figure 6:
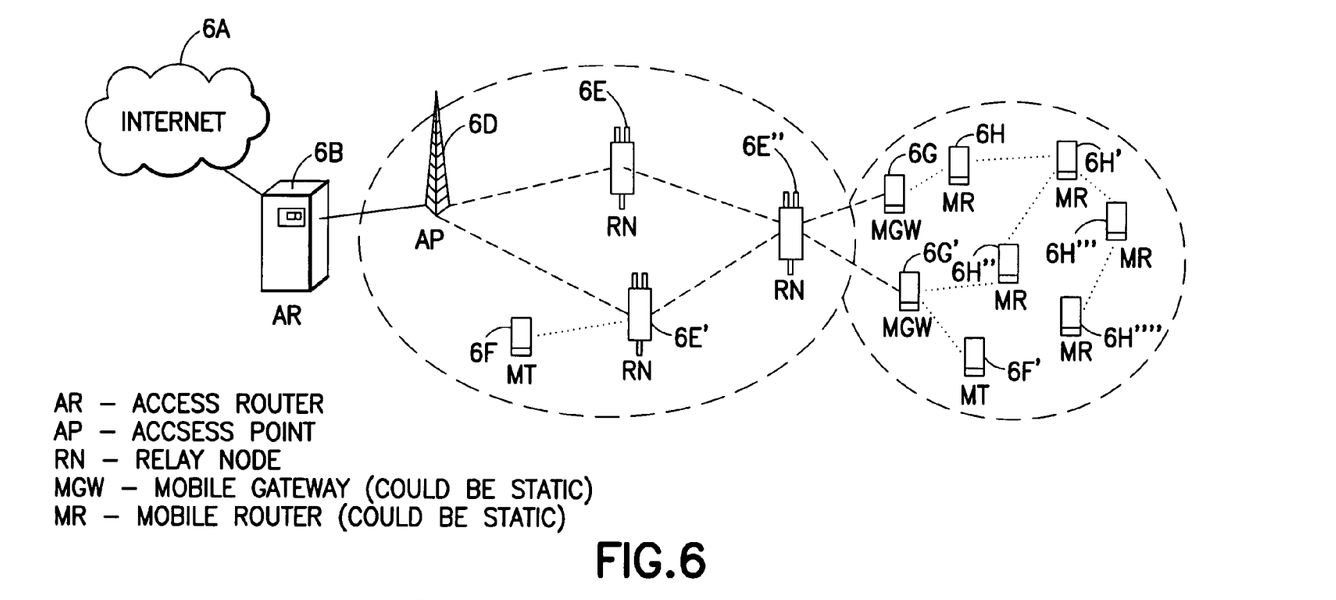
FIG. 6 is a schematic diagram of a wireless mesh network in which embodiments of the invention are advantageously employed.

FIG. 6 illustrates a network environment in which EAED might be employed. A packet may go in either direction, but for explanation consider a packet moving from the Internet 6A toward a mobile terminal MT 6F or 6F'. In transit, the packet goes through an access router AR 6B which is an edge router, and an access point AP 6D that controls access between the various relay nodes RN 6E, 6E' and 6E" and the Internet 6A. Note that the packet might be forwarded from the AP 6D to either of two illustrated RN's 6E, 6E' prior to being sent to the last RN 6E", indicating a mesh network. From that final RN 6E" the packet is relayed through one of several mobile gateways MGW 6G, 6G', and alternatively then either directly to the ultimate destination mobile terminal MT 6F' or through one or more mobile routers MR 6H, 6H', 6H", 6H'", 6H"" before being forwarded to the mobile terminal MT 6F'. A MT 6F may also receive its packet directly from a RN 6E' as shown. Assume for FIG. 6 that all indicated links between the AP 6D and either of the MTs 6F, 6F' and the furthest MR 6H"" are wireless. Any of the AP 6B (if operating on a battery power supply), the RNs 6H et al, the MGWs 6G et al, and the MR 6H et al, may employ the invention detailed above to advantage in relaying packets through the network.

Figure 7:
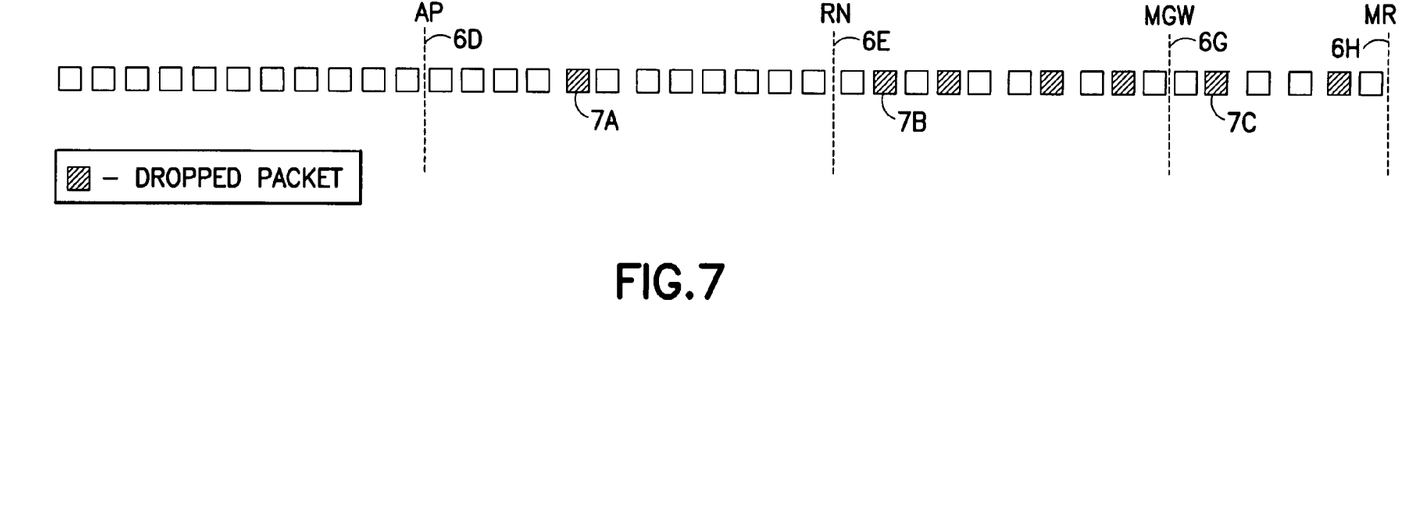
FIG. 7 is a schematic diagram showing a stream of packets moving through the mesh network of FIG. 6, including dropped packets.

FIG. 7 is a schematic diagram of a series of packets moving through the network of FIG. 6, with the AP 6D, an RN 6E, an MGW 6G, and a MR 6H shown by vertical dashed lines. Assume each packet is incoming to the next node shown to that packet's right in FIG. 7. The AP 6D is typically not powered by a portable power source since it is coupled to the AR 6B by a wireline connection, so each and every one of the packets incoming to the AP 6D are shown as being queued and forwarded toward the RN 6E.

At the RN 6E, the EAED algorithm is applied to each incoming packet, and one of them 7A is dropped due to energy considerations at the RN 6E in combination with other factored considerations such as packet type, average queue length, and consecutive drop considerations as noted above in the LVC example.

For the packets forwarded by the RN 6E toward the MGW 6G, the MGW 6G executes the algorithm on each and decides to drop four packets 7B while queuing and forwarding the remainder. Those packets incoming to the MR 6H are also evaluated according to the EAED system and two packets 7C are dropped. The algorithm for each may be the same, or different nodes within the same wireless network might use different variations of the EAED system.

Existing energy aware scheduling algorithms trade delay for energy consumption. Transmission rates are decreased so as to conserve energy consumed in the forwarding of packets. When energy is deemed low according to these algorithms, packets are delayed in the buffer as long as possible. These approaches are not seen as appropriate for real time traffic due to the induced delays, which are seen as inherent. Prior art approaches may be supplemented and improved by being combined with these teachings of EAED.

Lazy packet scheduling schemes delay packets in transmit buffers as long as possible to trade off energy with time utilizing properties of the radio channel. Using Energy Aware Early Detection, transmitting fewer packets, whenever possible, would save even more energy. Additionally, dropping non-real-time traffic using energy as a metric makes TCP endpoints to reduce their transmission rate. This facilitates lazy packet schemes because within a given unit of time there are fewer packets in the buffer, which can be subjected to more delay. Delaying RT packets within delay bounds is feasible. However, lazy packet scheduling alone is not an efficient solution. Therefore, this innovation complements and improves lazy packet scheduling approach with combined active queue management and scheduling schemes.

Active queue management schemes have been utilized for congestion avoidance in core Internet routers. However, these implementations of connection-oriented protocols, such as the widely used TCP protocol, generally watch for packet errors, losses, or delays in order to adjust the transmit speed. In the context of this invention we are dealing with energy conservation, particularly for wireless connections. Existing congestion avoidance algorithms do not use advanced energy assessment metrics as they are targeted at avoiding congestion. With EAED, dropping TCP traffic would facilitate lazy packet schemes, but the dropped packets would be retransmitted. Transmitting the same packets twice over wireless hops towards the TCP traffic origin, would actually increase energy consumption of the wireless relays on this path. EAED can be used together with NRT traffic, if an ECN type of approach (network level solution) is used together with the teachings of this invention as detailed above. Active queue management schemes such as RED are used for indirectly signal sender and receiver by deleting some packets. EAED can extend RED to non-connection oriented/real-time traffic. In this use end-points on the transport layer do not receive "signals" as the packets are simply dropped. The use of EAED can be optimized with the application layer, if applications can detect and utilize the packet drop information.

The ECN type of approach could be used to signal between routers differing from RED, which signals indirectly the TCP end-points. Explicit Energy Notification (EEN) may enable a network level solution using EAED. Explicit Energy Notification (EEN) could be used with EAED as follows.

In a hybrid (infrastructure+infrastructureless) network case, an energy limited wireless relay (e.g., a mobile gateway that aggregates traffic between ad hoc/mesh and infrastructure network, i.e., the next hop in down link from the infrastructure AP) turns on a special EEN bit in packets forwarded towards the AP in the uplink. The EEN bit informs the AP that the MGW is dropping packets due to low energy resources and insufficient recharging capability. The rate of EEN-marked packets equals the rate of dropped packets (by EAED) in the MGW queue. From this rate, the AP deduces the need for its own traffic shaping action. The AP can do one of the following: 1) use another MGW to connect to this particular ad hoc/mesh network; 2) load balance traffic between possible MGWs that are at its disposal; 3) use the same MGW but drop packets based on the EEN indication; and/or 4) combine items 2 and 3.

Embodiments to extend EAED with EEN as noted above requires the following:
 i. EEN support from AP and ad hoc nodes (acting as gateways)
 ii. EAED support from ad hoc nodes
 iii. EAED support in the AP (when making packet discard decision in the AP, energy assessment of the AP is replaced with EEN indicators received from the MGW)

EAED extended with EEN provides the following benefit. MWG saves twice (DSSS) the energy using a hybrid EEN-EAED as compared to using only EAED in relay, where received packets are dropped before relaying them further. This follows from the fact that as the AP is dropping packets on behalf of the MGW, the MGW does not need to use energy in their reception. In direct-sequence spread-spectrum (DSSS) radios, such as those specified by 802.11 and 802.15.4, receive power is similar to transmit power because of the power-hungry correlator circuitry that must be running in receive mode. While the transmitter may frequently not operate, the receiver is usually continually operating in a listening mode.

Energy aware metrics proposed for example in MANET routing protocols incorporate use transient residual battery energy capacity information as a routing metric. This invention advances this concept by using advanced energy assessment, and further that advanced assessment is used for active queue management rather than for routing.

Advantages of using Energy Aware Early Detection include the following:

- An energy-aware solution for a wireless relay, especially on one acting as a gateway (MGW) towards infrastructure networks and which aggregates traffic.
- For RT traffic, it conserves battery power by forwarding/transmitting less RT traffic.
- It degrades quality of RT based traffic gracefully, i.e., tradeoff quality against network lifetime. A gradient of quality degradation in this case would be continuous up to the point where another path in the network is chosen.
- For NRT traffic, it indirectly informs TCP endpoints not of congestion but of bottlenecks due to low energy. Connection endpoints may then reduce their transmission rate, which facilitates the use of lazy packet scheduling schemes.
- It avoids incorrect forward/discard decisions based on limited transient residual battery energy capacity status information.
- It avoids (renders unnecessary) the delay of waiting for the battery to recharge over a certain $R_{min}$ threshold, if recharge is taking place. The result is that it improves wireless network throughput.
- It shapes traffic locally to flexibly match the ad hoc/mesh network resources.
  - As an aggregation point, the MobileGW (in a MANET ad hoc network) is the bottle-neck infrastructure connectivity, i.e., its local performance decision results in the optimal solution.
  - There are no complex QoS protocols and/or architectures.
  - The EEN bit (or EEN concept) can used as an extension to basic EAED.
- It maximizes the connection lifetime for ad hoc/mesh network infrastructure.

Disadvantages are seen to be minimal; an increased wireless relay device switch implementation complexity, and possibly reduced audio/video quality.

Now, there are certain networks/systems that use a probe message or probe packets to manage congestion. The inventors have found that the rate at which these probe messages/packets are queued or dropped has an effect on how they perform their underlying purpose of congestion avoidance. For example, currently standardized IETF MANET ad hoc protocols comprise of DYMO and OLSRv2. Both of these protocols have the ability to and rely on sending probes in the form of Hello messages to assess route status and link quality for the routes in the node's routing table. Also, complex QoS methods have been proposed in the form of integrated services or differentiated services, generally termed DiffServ. Additionally, routing solutions have been proposed, where a wireless relay's battery status is included as a routing metric.

To use the embodiments described only as above, where the probe packets are queued or dropped as any other packet, would result in suboptimal performance when used with these periodic Hello messages. An aspect of this invention targets the most energy consuming traffic flows and transmissions. For example, if a given real time traffic flow is consuming a significant portion of network resources (e.g., high quality audio/video), that real time traffic flow can also tolerate reduction of connection quality. Hence, the probability of packet discard for this given flow is increased.

Hello messages send by MANET ad hoc protocols are a form of connectionless UDP (user datagram protocol, an Internet protocol generally less complex and therefore faster than transport control protocol TCP). However, the transmission interval for these Hello messages is usually on the order of a few seconds. By design these very small Hello messages are not prone to create traffic congestion. As a result, Hello messages would not be discarded by the active queue management according to the more basic embodiments of this invention.

So using those more basic embodiments in a network that operates with Hello messages may cause the connection quality to drop, but the ad hoc routing protocols would be unaware of this because the Hello probes do not indicate it. Wireless relays might not investigate the search for an alternative route and may end up using use suboptimal routes for their traffic.

Figure 8:
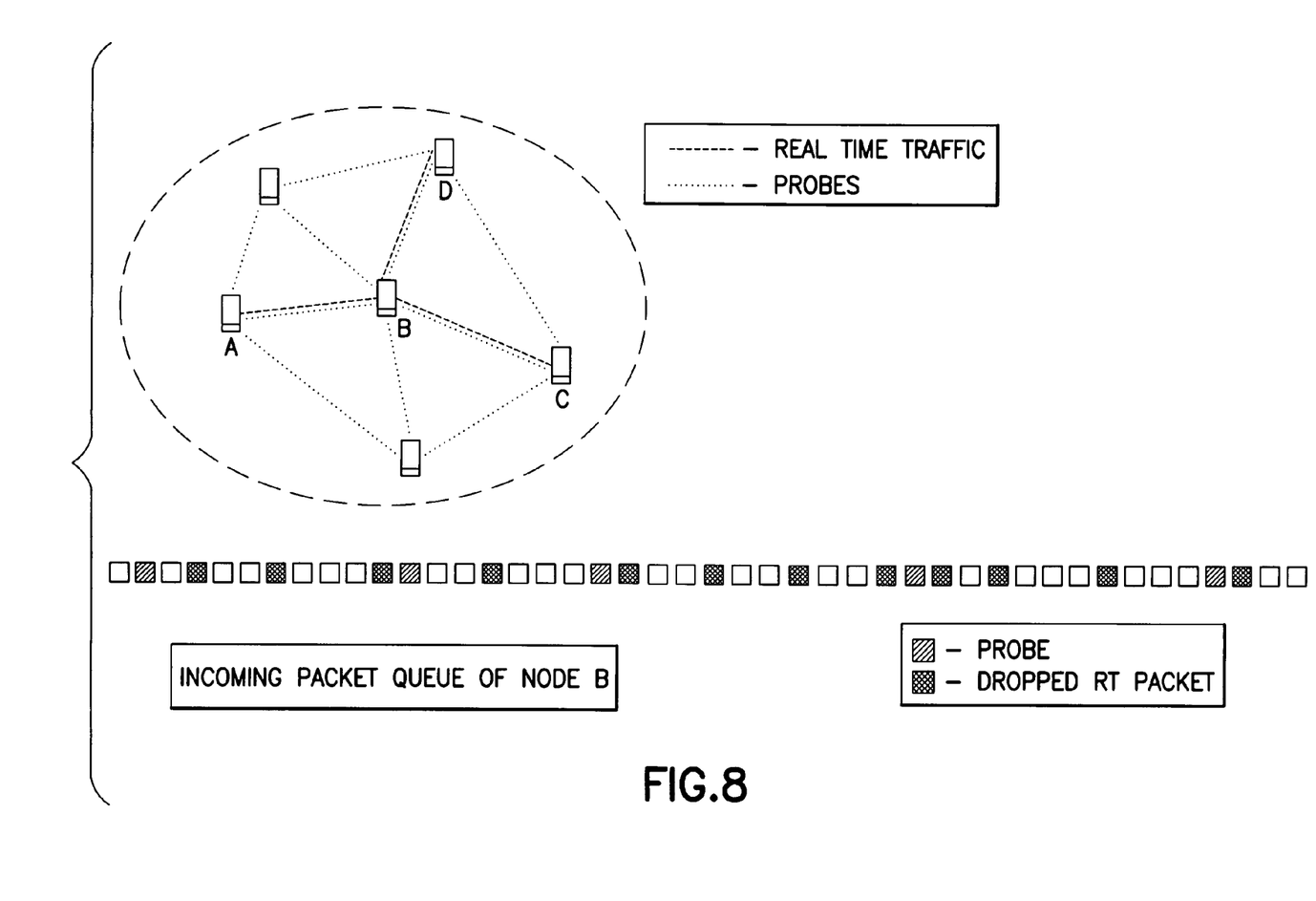
FIG. 8 is a diagram similar to FIG. 7 but within a system that uses probe packets, illustrating suboptimal operation without support for different treatment of the probe packets.

This problem is shown in the schematic diagram of FIG. 8. Consider that node A is the transmitting node from which the real time data packets are sent (though they may originate elsewhere), node B is a relay node which relays those packets from sending node A to further nodes C and D. As indicated by the faint dotted lines in FIG. 8, each of these nodes sends Hello probes (or more generically probe packets or probe messages) to other nodes in the network in order to monitor and manage congestion at those other nodes. Now consider that relay node B begins to experience a depleted battery supply as indicated by a high rate of change of residual power, and so uses EAED in accordance with one of the embodiments detailed above to reduce its outgoing flow of packets to nodes C and D. Even with EAED, the probe packets/messages received at node B are not dropped by the EAED algorithm, because they appear seldom in comparison to other traffic. In the incoming packet queue shown at the bottom of FIG. 8, there are five Hello probes but none of them are dropped. Because relay node B drops other packets (indicated in the incoming packet queue by darker shading) but not the Hello probes, nodes A, C and D incorrectly assess the quality of their links through the relay node B, and do not reduce traffic to node B as the Hello probes are intended to do. Node B continues to operate using EAED, but without an alternative power supply or a reduced load, node B eventually ceases to operate due to lack of power.

To address these and other such systems that use a probe packet to enable congestion management, the embodiments detailed above are extended to be compatible with IETF MANET protocols. More generally, the embodiments detailed below enable the use of the EAED concept with any networking protocol or technology that uses probing to acquire link quality assessments. Specifically, these embodiments result in the Hello probes that are received by a wireless relay node being discarded in proportion to an average EAED data packet discard rate, instead of the actual reception rate of the Hello probes.

To enable this, the Hello probes are distinguished or identified from the rest of the incoming UDP traffic to enable this special treatment. Above were described embodiments where packets were distinguished by type or classification of the packet (e.g., RT or NRT). Those previously described distinctions are for data packets. Probe packets are not data packets, and so they are distinguished over and above any further distinction that may be made among the data packets so that embodiments may employ both RT/NRT distinctions and data/probe packet distinctions.

The discard decision for probe packets should be made as fast as possible to allow a fast response time, a short route change convergence time, and the correct link quality status information to the probing nodes (nodes A, C and D in FIG. 8). In order to find out the given Hello probe interval, a certain number of Hello messages (minimum of two) have to waited. The exact number of Hello messages that the relay node must receive to reliably determine their transmission interval depends also on the connection characteristics such as delay, jitter and packet loss. This means that two packets sent at a specific interval X between them (e.g., X, 2X, 3X . . . ) may be received at variable times (e.g., X+y and 2X+z). The induced delays are of a stochastic nature.

The Hello probe interval is decided by the transmitting node, and more than one transmitting node may send packets to a particular relay node. For example, the flow in FIG. 8 might be reversed, with nodes C and D sending packets to relay node B, which relays those received packets to node A and additional nodes not shown in FIG. 8. Therefore, the resulting Hello probe discard rate at a single relay node will be different for the differing probe periods of the differing sending nodes. One way for the relay node to track this is to maintain a data vector for each different entity that sends Hello probes to it. A relatively small data storage space is needed at the relay node for keeping vectors for received probes from the various transmitters. Vector data can be replaced in a round-robin manner, calculating for example a certain sliding window average discard rate. Note that calculating a queuing/transmitting rate gives the same information as calculating the discard rate. Also, in assessing the probe transmission interval before the relay node can react by discarding Hello probes at the proper rate, a small network characteristic dependant delay is induced. None of these are seen as particularly burdensome as compared to the advantages these embodiments offer.

Figure 9:
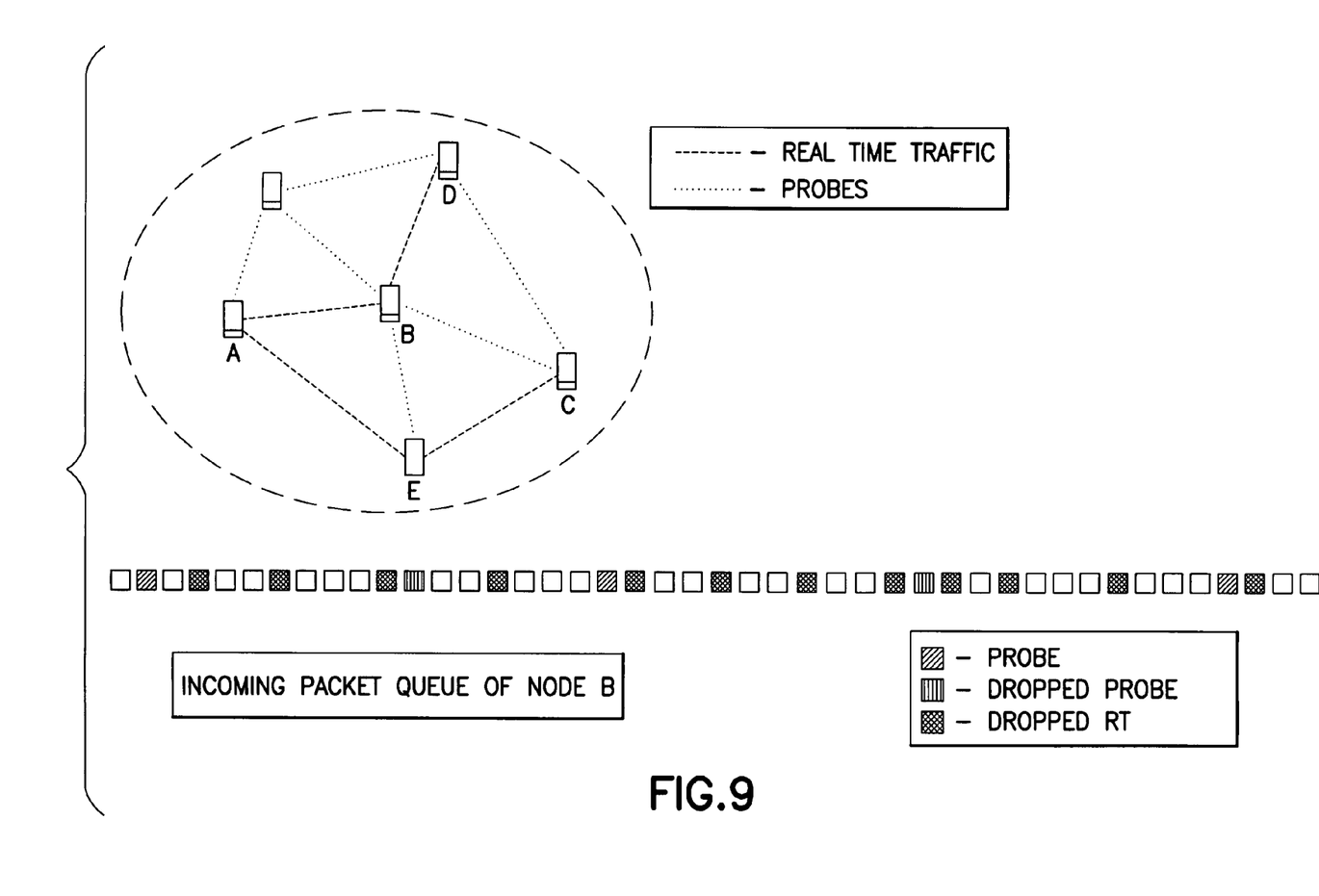
FIG. 9 is a diagram similar to FIG. 8 but showing an embodiment with support for probe packets and exploitation of an alternate pathway in the network.

An example of a probe-sensitive embodiment is shown in the schematic diagram of FIG. 9. Assume for FIG. 9 that the initial arrangement of nodes is as described for FIG. 8: node A sends packets to relay node B, which forwards them to nodes C and D. As the residual battery supply of node B decreases at a certain rate (along with other parameters of the algorithm as detailed above), node B discards according to the displayed incoming queue shown at the bottom of FIG. 9. There are 44 packets shown there: 39 RT data packets of which twelve are dropped, and five probe packets of which two are dropped. The rate of the dropped data packets is then 12/39=31%, so the relay node B knows to drop those probe packets it receives as the same rate, shown as 2/5=40% which is the nearest drop rate one could achieve to the RT data packet drop rate with only five probe packets. The relay node B may alternatively compute its average drop rate for all packets as 14/44=32% and then force its drop rate for the probe packets to equal that (to the nearest possible given that dropping a packet is a binary decision and a partial packet cannot be dropped to rate-match exactly).

Note that in FIG. 9 all of the packets are received from the same sending node A, but in the queue the probe packets are not evenly spaced. This is due to the discrepancy between sending interval and receiving interval as noted above. Were it not for that discrepancy, the relay probe could merely count packets from a particular sender to determine which are probe packets and which are not. In other systems where counting alone would induce excessive error in deciding which is a probe packet and which is not, the relay probe may make that determination by packet size alone, by a bit sequence set in the probe packet identifying it as such, or by some combination of size, interval, and bit sequence. Reading a bit sequence is seen as less preferred as it requires additional power from the relay node to open and read the packets and further slows the entire decision process.

Now that the relay node B has dropped its probe packets in proportion to the average discard rate (whether that average discard rate is computed for all received packets, for all received data packets, or some other basis), the sending node A knows from the pre-existing protocol for the probe packets (ACK, NACK, etc) that the link though relay node B is less than optimal, and implicitly knows that the reason is because relay node B is dropping packets at a fairly high rate. The sending node A makes this assessment according to this embodiment without any additional explicit signaling of energy, bandwidth, interference, or any further processing overhead. Once the sending node A makes that assessment, it can explore other available links to relieve or entirely eliminate its traffic to the relay node B, which in FIG. 9 is shown as sending to another node E some of its packets destined for node C and continuing to send its packets destined for node D through the subject relay node B.

Instead of a complex signaling protocol, these embodiments for EAED with probe packet support enable the sending node to implicitly acquire the correct link quality assessment and route status information in a wireless relay network, and is available for any networking protocol or technology that uses probes to acquire link quality assessment, not just the specific example of Hello probes and MANET. No changes are required to those existing protocols or technologies (e.g., DYMO or OLSRv2). From the probe packet discard rate, the sending/probing relay nodes assess the link quality and update their routing tables accordingly. These embodiments also maximize network lifetime because they enable balancing of energy usage in the network; alternative routes are chosen based on probe packet drop rates where the probe packet drop rate reflects battery status in a relay node in the network.

Figure 10:
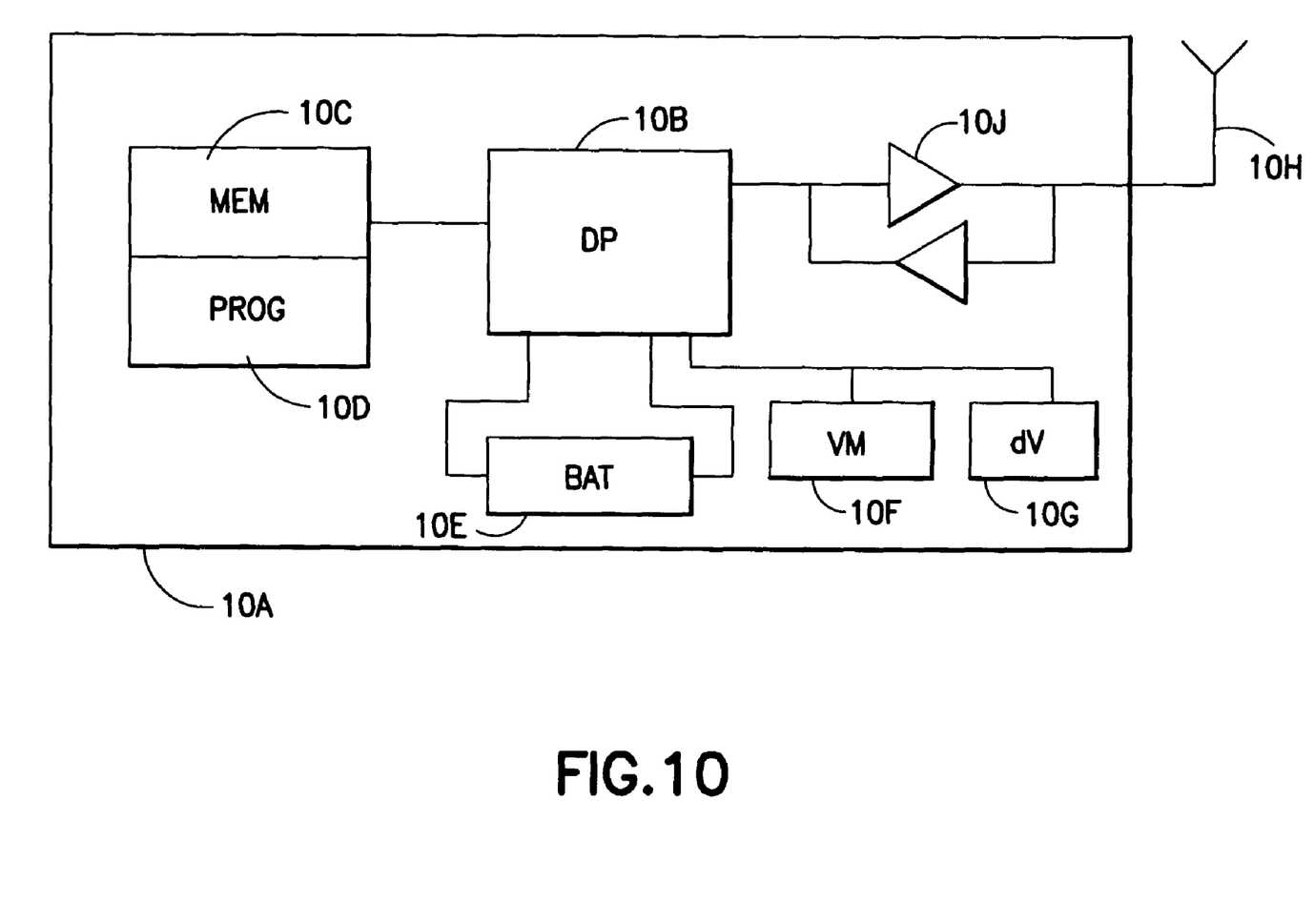
FIG. 10 is a schematic diagram of a network node such as anyone of those shown in FIG. 6 in which the invention may be embodied.

FIG. 10 illustrates in schematic block diagram relevant functional blocks of a network element or relaying node 10A for practicing the EAED teachings above, such as an RN, MGW, MR, or even a MT when the MT is used as a relay node (e.g., a laptop computer might operate as a relay node in a WLAN or WIFI network). The present invention may be disposed in any host computing device that is used as a relay node for packets being transported through a network, most advantageously for a host device that wirelessly relays such packets and operates with a portable power source. A MT 6F is a handheld portable device that is capable of wirelessly accessing a communication network, such as a mobile telephony network of base stations that are coupled to a publicly switched telephone network. A cellular telephone, a Blackberry® device, a laptop or other portable computer, and a personal digital assistant (PDA) with internet or other two-way communication capability are examples of a MT 6F, and the MT 6F may access only local networks such as a wireless localized area network (WLAN) or a WIFI network without an additional cellular/PCS capability.

The component blocks illustrated in FIG. 10 are functional and the functions described below may or may not be performed by a single physical entity as described with reference to FIG. 10. The network relaying host device 10A includes a portable power source 10E such as a self-contained battery that provides electrical power to a central processor 10B that controls functions within the node 10A. Within the processor 10B are functions such as digital sampling, decimation, interpolation, encoding and decoding, modulating and demodulating, encrypting and decrypting, spreading and despreading, and additional signal processing functions known in the art, as appropriate to the particular protocol in use for the wireless network.

Computer programs 10D such as algorithms to modulate, encode and decode, data arrays such as look-up tables, and the like, as well as an EAED algorithm such as those described above are stored in a main memory storage media 10C which may be an electronic, optical, or magnetic memory storage media as is known in the art for storing computer readable instructions and programs and data. The main memory 10C is typically partitioned into volatile and non-volatile portions, and is commonly dispersed among different storage units, some of which may be removable. The relay device 10A communicates over the network link such as a WLAN or WIFI link via one or more antennas 10H that may be selectively coupled via a T/R switch or a diplex filter (not shown), to a transmitter and a receiver (shown together as a transceiver 10J). The relay device 10A may additionally have secondary transmitters and receivers for communicating over additional networks. Also shown in FIG. 10 are a voltmeter (VM) 10F and a voltmeter rate detector (dV) 10G to illustrate the functions of/apparatus for measuring R and dR/dt (or $d^2R/d^2t$). Such functionality may be built into the DP 10B but are shown separately for clarity of description. Not shown in FIG. 10 but inherent is an external receptacle for accepting recharge of the battery 10E, as such a receptacle depends greatly on the means by which the battery is recharged. Several examples are given above.

Embodiments of this invention may be implemented by computer software executable by a data processor of the relay node/host device 10A, such as the processor 10B, or by hardware, or by a combination of software and hardware. Further in this regard it should be noted that the various blocks of the logic flow diagram of FIG. 2 may represent program steps, or interconnected logic circuits, blocks and functions, or a combination of program steps and logic circuits, blocks and functions.

The memory or memories 10C may be of any type suitable to the local technical environment and may be implemented using any suitable data storage technology, such as semiconductor-based memory devices, magnetic memory devices and systems, optical memory devices and systems, fixed memory and removable memory. The data processor(s) 10B may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

From the above description it is clear that the present invention may be embodied as a method, network relay node/host computing device, computer program product, and/or integrated circuit configured to evaluate conditions for forwarding an incoming/buffered packet by computing an energy assessment that takes into consideration a derivative of residual capacity of a portable power supply of the relay node/host device, and determines, based on the energy assessment, whether to queue the incoming/buffered packet for forwarding or to drop it. The conditions evaluated may additionally/alternatively include any or all of an average queue length, a classification/type of the packet, and a total energy capacity of the portable power source. The various conditions may be differentially weighed so as to favor one condition over another in certain circumstances. An additional parameter that may be evaluated in the queue/drop decision is whether or not other packets were dropped, where those other packets are consecutive with the subject incoming/buffered packet along the same flow over which the incoming/buffered packet is received. From the energy perspective, all RT packets in breach with a given delay boundary could be dropped. However, EAED offers a more sophisticated solution of wider randomized dropping distribution avoiding consecutive packet drops. At the receiving end point of a given traffic flow, this approach reduces delay variance (jitter) between received RT packets. This, in turn, improves the received video/audio quality in comparison to a case with high delay variance resulting from consecutive packet drops.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:

1. A method comprising:
   receiving an incoming data packet;
   determining a rate of change of residual capacity of a portable power supply;
   deciding at a device powered by the portable power supply to queue for transmission or to drop the incoming data packet based on the determined rate of change; and
   transmitting or dropping the incoming data packet according to the decision;
   wherein the incoming packet comprises a video data packet and the decision is further based on video data packet type, wherein the decision weights a video data packet base layer type differently than a video data packet enhancement layer type so as to favor queuing for transmission the base layer type over the enhancement layer type.

2. The method of claim 1, wherein the rate of change is one of a first and a second derivative of the residual capacity with respect to time.

3. The method of claim 1, wherein the decision is based on a total energy capacity, a residual energy capacity, a first derivative of the residual energy capacity and a second derivative of the residual energy capacity of the portable power supply.

4. The method of claim 1, wherein the decision is further based on a data packet classification.

5. The method of claim 1, wherein the decision is further based on whether other data packets were previously dropped, said other data packets being on a same flow as the incoming packet.

6. The method of claim 1, executed on a plurality of consecutive incoming data packets, wherein each decision to drop one of the incoming data packets is proportional to a state of the residual capacity of the portable power supply.

7. The method of claim 1, executed by a wireless mobile device wherein the incoming data packet is received over a first wireless link and for the case where the decision is to queue the incoming data packet for transmission the incoming packet is transmitted over a second wireless link.

8. The method of claim 1, further comprising:
  determining an average drop rate for a series of data packets; and
  for a plurality of received congestion probe packets, dropping some of the plurality of congestion probe packets consistent with the determined average drop rate and queuing for transmission the remaining ones of the plurality of congestion probe packets.

9. The method of claim 1, wherein the average drop rate is for data packets received from a first sending node and determining the average drop rate comprises maintaining a first data vector of the average drop rate from the first sending node, the method further comprising maintaining a second data vector of an average drop rate for packets received from a second sending node.

10. A method comprising:
  receiving an incoming data packet;
  determining a rate of change of residual capacity of a portable power supply;
  deciding at a device powered by the portable power supply to queue for transmission or to drop the incoming data packet based on the determined rate of change; and
  transmitting or dropping the incoming data packet according to the decision;
  wherein the decision is based on:
    an energy factor EF determined from the residual capacity;
    a position PQ of the incoming data packet relative to other packets in a queue;
    length of the queue QL;
    packet age in the queue PAQ;
    real time or not real time data packet type; and
    previous consecutive dropped data packets for a flow on which the incoming data packet arrives.

11. A memory storing a program of machine-readable instructions, executable by a digital data processor, to perform actions directed toward gracefully degrading packet relay, the actions comprising:
  receiving an incoming data packet;
  determining a rate of change of residual capacity of a portable power supply;
  deciding to queue for transmission or to drop the incoming data packet based on the determined rate of change; and
  transmitting the incoming data packet or dropping the incoming data packet according to the decision;
  wherein the incoming packet comprises a video data packet and the decision is further based on video data packet type, wherein the decision weights a video data packet base layer type differently than a video data packet enhancement layer type so as to favor queuing for transmission the base layer type over the enhancement layer type.

12. The memory of claim 11, wherein the decision is based on a total energy capacity, a residual energy capacity, a first derivative of the residual energy capacity and a second derivative of the residual energy capacity of the portable power supply.

13. A device comprising:
  a transmitter;
  a receiver adapted to receive an incoming data packet over a first wireless link;
  a portable power supply; and
  at least a processor adapted to:
    determine a rate of change of residual capacity of the portable power supply, and to decide to queue for transmission or to drop the incoming data packet based on the determined rate of change;
  wherein for the case where the decision is to queue the incoming data packet for transmission the transmitter is adapted to send the data packet over a second wireless link, and for the case where the decision is to drop the data packet at least the processor is configured to cause the data packet to be deleted without being sent;
  wherein the incoming packet comprises a video data packet and the decision is further based on video data packet type, wherein the decision weights a video data packet base layer type differently than a video data packet enhancement layer type so as to favor queuing for transmission the base layer type over the enhancement layer type.

14. The device of claim 13, wherein the decision is based on a total energy capacity, a residual energy capacity, a first derivative of the residual energy capacity and a second derivative of the residual energy capacity of the portable power supply.

15. The device of claim 13, wherein the decision is further based on a data packet classification.

16. The device of claim 13, wherein the decision is further based on whether other data packets were previously dropped, said other data packets being on a same flow as the incoming packet.

17. The device of claim 13, wherein the processor is further adapted to:
  determine an average drop rate for a series of data packets; and
  for a plurality of received congestion probe packets, to decide to drop some of the plurality of congestion probe packets consistent with the determined average drop rate and to decide to queue for transmission the remaining ones of the plurality of congestion probe packets.

18. A device comprising:
  a transmitter;
  a receiver adapted to receive an incoming data packet over a first wireless link;
  a portable power supply; and
  at least a processor and adapted to:
    determine a rate of change of residual capacity of the portable power supply, and to decide to queue for transmission or to drop the incoming data packet based on the determined rate of change;
  wherein for the case where the decision is to queue the incoming data packet for transmission the transmitter is adapted to send the data packet over a second wireless link, and for the case where the decision is to drop the data packet at least the processor is configured to cause the data packet to be deleted without being sent;
  wherein the decision is based on:
    an energy factor EF determined from the residual capacity;
    a position PQ of the incoming data packet relative to other packets in a queue;
    length of the queue QL;
    packet age in the queue PAQ;
    real time or not real time data packet type; and
    previous consecutive dropped data packets for a flow on which the incoming data packet arrives.

* * * * *